Patented May 29, 1934

1,960,233

UNITED STATES PATENT OFFICE 1,960,233

PRODUCTION OF ANTHRAQUINONE COLORING MATTERS

Joyce H. Crowell and James Ogilvie, Buffalo, and Donald G. Rogers, Hamburg, N. Y., assignors to National Aniline & Chemical Company, Inc., New York, N. Y., a corporation of New York No Drawing. Application June 22, 1928,
Serial No. 287,634

32 Claims. (Cl. 260—59)

This invention relates to improvements in the manufacture and production of anthraquinone coloring matters which are sulfonic acid derivatives of the products obtainable by condensing an aromatic primary amine with a hydroxyanthraquinone compound.

The improved process of the present invention comprises condensing a mixture of chlorphenols with phthalic anhydride in the presence of aluminum chloride to produce a mixture containing a chlorhydroxybenzoylbenzoic acid and a chlorhydroxyanthraquinone; subjecting this mixture to the action of sulfuric acid or oleum, preferably in the presence of boric acid, under such conditions and in such a manner as to convert the benzoyl-benzoic acid derivative to an anthraquinone derivative and to ultimately replace by hydroxyl groups the chlorine atoms which are in the alpha-position of the chlorhydroxyanthraquinone bodies which are formed, or are present; treating the anthraquinone derivatives or bodies thus produced with an aromatic primary amine in such a manner as to form a condensation product (color base); sulfonating the condensation product thus obtained by means of a suitable sulfonating agent; and finally isolating the sulfonated product. The invention includes certain improvements in one or more of the various steps of operation as well as in the combination of these operations, and also in the combination of certain steps in the operation, all as more fully hereinafter set forth and as claimed.

In carrying out the present invention, the mixture of chlorphenols which is particularly employed as an intermediate in the production of the contemplated anthraquinone coloring matters is preferably prepared by treating phenol with a current of chlorine gas until the reaction-mass, from which the hydrogen chloride has been mostly, if not entirely, eliminated, has increased in weight to an amount which corresponds approximately to dichlorination. The reaction is preferably carried out at a temperature maintained slightly (i. e. 1° to 5° C.) above that required to keep the phenol and the reaction-mass in a molten state. The crude product which is obtained consists largely of 2.4-dichlorphenol associated with other chlorphenols, e. g., mono-chlorphenols, and has a setting-point of about 35°-37° C. A mixture of chlorinated phenols having a setting-point of about 40°-42° C. may be produced in an analogous manner by chlorinating 4-chlorphenol.

The condensation of the chlorphenol, particularly the crude mixture of chlorinated phenols having a setting-point of about 35°-37° C. and consisting largely of 2.4-dichlorphenol, with phthalic anhydride in the presence of aluminum chloride is effected to advantage by heating at comparatively high temperatures, e. g., about 160°-200° C., with good agitation, and by using an excess of phthalic anhydride and of aluminum chloride over that heretofore proposed for a given quantity of dichlorphenol. In this manner, the condensation product is obtained in excellent yields and of high quality. The final product thus obtained from the crude dichlorinated phenol, after isolation, is comprised mainly of dichlorhydroxybenzoylbenzoic acid and dichlorhydroxyanthraquinone associated with lesser amounts of other substances, e. g., corresponding monochlor bodies. These products are not separated from each other but the crude mixture as such is subjected to the action of sulfuric acid or oleum, preferably in the presence of boric acid, to effect ring closure of the benzoylbenzoic acid derivative and to replace the chlorine atom or atoms which are present in the alpha position or positions of the anthraquinone nucleus by a hydroxyl group or groups whereby hydroxyanthraquinone bodies are produced, the final product being a mixture of various amounts of hydroxy-, and chlorhydroxy-, anthraquinone compounds or derivatives, and composed chiefly of 2-chlorquinizarine (2-chlor-1.4-dihydroxy-anthraquinone).

The crude mixture of hydroxyanthraquinone compounds thus obtained, without purification or isolation therefrom of the 2-chlorquinizarine, is then heated with aniline, or another aromatic primary amine, or a mixture of amines, the water, or a controlled portion thereof, which is formed or present in the reaction-mass being removed or eliminated from the reaction mixture during the operation. The degree or amount of condensation of the amine with the hydroxyanthraquinone or the chlorquinizarine, which governs the shade of the final dyestuff, may be controlled by controlling the amount of water removed.

At the completion of the reaction, the resulting mass is treated with dilute sulfuric acid under suitable conditions to remove the excess aniline, or other amine, and the insoluble color base is recovered. It comprises a mixture of amino-, and aminohydroxy-, anthraquinone compounds.

In order to sulfonate the color base it is dissolved in about 4 to 10 parts of sulfuric acid and heated at a moderate temperature, for example about 20°-60° C., for 1 to 12 hours or until the reaction is complete. The sulfonation mass is then added to a strong salt solution, the percipitated dyestuff is filtered off, and the filter cake is dried. If so desired the filter-cake may be removed from the filter and, without dilution with water, stirred under suitable conditions of temperature until the paste assumes the form of a granular suspension, which then may be filtered and dried. The resulting product comprises a mixture of sodium salts of sulfonic acids of arylamino-, and arylaminohydroxy-, anthra-quinone compounds. The following theoretical formulæ are presented as a graphical illustration of the procedure, but it is not intended thereby to limit the invention to any theoretical formulæ or theoretical products.

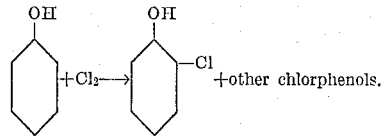

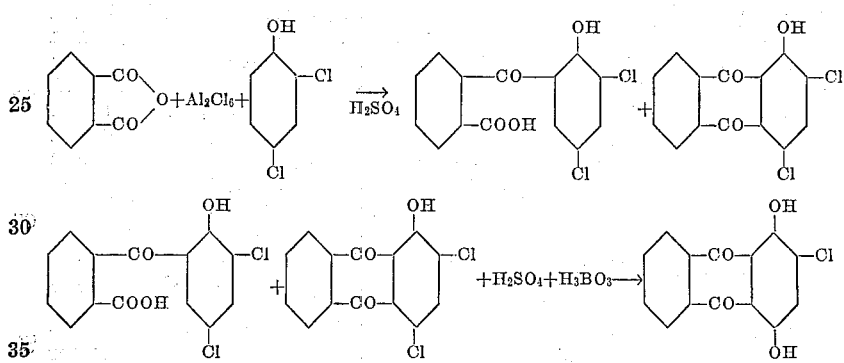

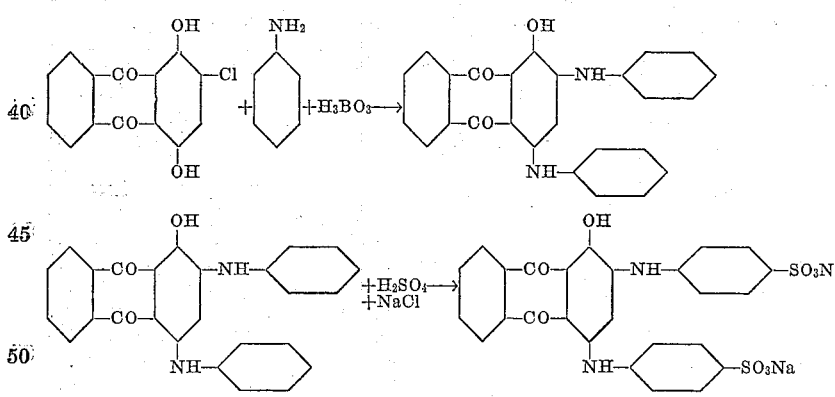

The invention will be further illustrated by the following specific example, it being understood that the invention is not limited thereto. The parts are by weight.

*Example*

*Chlorination of phenol.*—100 parts of crystallized phenol (M. P., 40°–41° C.) are melted in a vessel provided with heating and cooling means and equipped with an agitator. Into the well stirred phenol at an initial temperature of about 42°–43° C. a current of chlorine is introduced as rapidly as it is absorbed. Upon the introduction of chlorine into the melted phenol the setting-point of the reaction-mass gradually falls to about 10° C. or lower and then rises. During this period, the reaction-mass is cooled by the cooling means, the temperature being by preference kept slightly (i. e., 1° to 5° C.) above the setting-point of the mixture until about 100 parts of chlorine have been added. The introduction of chlorine is then continued until about 150 to 155 parts of chlorine have been absorbed and the weight of the crude chlorinated phenol corresponds approximately to dichlorination. Upon continued introduction of chlorine the temperature of the reaction mass is allowed to rise to about 38°–40° C. and is maintained at this point until the chlorination is complete. When completed, the setting-point of the reaction-mass is about 35°–37° C.

The reaction mass is then heated to about 85°–100° C. for one-half hour or so to remove most or all of the hydrogen chloride which may be present. Although the compositin of the resulting product is not definitely known, it is regarded as being comprised chiefly of 2.4-dichlorphenol associated with various amounts of other chlorphenol bodies.

In a similar manner, 4-chlorphenol can be chlorinated by treating it with chlorine at a temperature of about 40°–45° C. until the setting-point of the reaction-mass falls and then rises to about 41° C. The amount of chlorine employed is approximately that required to effect the formation of a dichlorphenol.

In the chlorination of the phenol, or 4-chlorphenol, it is preferable that substantially dry materials be employed. The presence of water considerably lowers the setting-point of phenol, and also that of the reaction-mass, and adversely affects the quality of the product for subsequent use in condensation with phthalic anhydride for the production of benzoylbenzoic acid derivatives.

*Condensation of chlorphenol mixture with phthalic anhydride.*—In a vessel provided with heating and cooling means, a vent, and a strong agitator having blades which scrape the sides of the vessel, 100 parts of phthalic anhydride and 300 parts of anhydrous aluminum chloride are ground together until they are intimately mixed. The mixture is then heated to a temperature of about 125°–130° C., at which temperature it is in a semi-molten state. To the heated mixture is added with stirring 100 parts of the crude mixture of chlorphenols containing 2.4-dichlorphenol, having a setting point of 35° to 37° C. and obtained in accordance with the process hereinbefore described, which is melted and at a temperature of about 50° to 70° C. The temperature of the reaction mass rises to about 150°–155° C. After the chlorphenol is added, the mixture is heated and maintained at a temperature of about 170° C. to 180° C. until the evolution of hydrogen chloride has practically ceased and the mass has become viscous and of a dough-like consistency which will stir only with difficulty, if at all. Stirring of the mass is then stopped and the mass is allowed to cool until it solidifies, when the agitator is again started and the mass is ground to a powder in the reaction vessel. The powdered mass, which comprises the complex condensation product of aluminum chloride, phthalic anhydride, and the chlorphenol mixture, is then added, with stirring, to a mixture of about 1550 parts of dilute sulfuric acid of about 3 to 5 per cent strength, previously cooled to about 5° C. The resulting mixture is heated to 90°–95° C. and held at this temperature for 1 to 2 hours to complete the decomposition of the complex condensation product. Sufficient water is then added to the hot mixture to cool it to about 55°–60° C., it is filtered, and the precipitate is washed with water until substantially free from sulfuric acid, and dried. The precipitate is comprised mainly of 3′.5′-dichlor-2′-hydroxybenzoyl-o-benzoic acid and 2.4-dichlor-1-hydroxyanthraquinone, together with other chlorhydroxybenzoyl-o-benzoic acids and chlorhydroxyanthraquinones.

It may be pointed out that the molten chlorphenol is added to the hot mixture of phthalic anhydride and aluminum chloride as fast as possible, avoiding any substantial loss of chlorphenol by entrainment in the hydrogen chloride which is evolved. In the isolation of the final product by treating the mass with dilute sulfuric acid and filtering, practically all of the aluminum salts, resulting from the decomposition of the complex condensation product, and unchanged chlorphenol are removed.

It may be also pointed out that the condensation of the chlorphenol with the phthalic anhydride may be carried out at temperatures of about 120°–200° C., particularly at an initial temperature of 120°–160° C. and at a final temperature of 160°–180° C. Higher temperatures also may be employed, but at temperatures higher than about 200°–210° C. decomposition arises and the yields are lowered. Further, for each mol of the chlorphenol, regarded as dichlorphenol, other proportions of phthalic anhydride and aluminum chloride may be used, for example, 1 to 2 mols of phthalic acid and 1.5 to 2.5 mols aluminum chloride.

*Ring closure and hydrolysis.*—In a vessel provided with heating and cooling means and equipped with an agitator, 400 parts of 26 per cent oleum and 50 parts of crystallized boric acid are heated with stirring to 160°–165° C. To this mixture maintained at this temperature there is added 100 parts of the mixture comprising 3′.5′-dichlor-2′-hydroxybenzoylbenzoic acid and 2.4-dichlor-1-hydroxyanthraquinone (obtainable as described above), and the mixture is held at this temperature with agitation for 5 to 6 hours or until the ring closure and hydrolysis are complete. When the reaction is completed, the reaction mass is added to about 5000 parts of warm water and then heated to 90°–95° C. for about 1 hour. The precipitate is filtered off, washed with water until substantially free from acid, and then dried. The crude precipitate is a mixture of chlorhydroxy-, and hydroxy-, anthraquinone compounds or derivatives of which 2-chlorquinizarine is the chief constituent.

In carrying out the ring closure and hydrolysis, the temperature employed should not be above about 180° C., otherwise decomposition takes place and the yields are lowered. In place of 26 per cent oleum, oleums of other strengths may be used, e. g., from 1 to 26 per cent or higher. Although sulfuric acid monohydrate may be used, the use of oleum is commercially advantageous in that less of it can be used and it also permits the use of crystallized boric acid. While the condensation and hydrolysis can be carried out at temperatures lower than 160°–180° C., for example at temperatures as low as 120°–130° C., at these temperatures, and lower, the reaction-mass foams badly and is difficult to control. Moreover, the resultant condensation product is of inferior quality. If the reaction is carried out in the absence of boric acid, the final product is a mixture of chlorhydroxyanthraquinones of which 2.4-dichlor-1-hydroxyanthraquinone is the chief constituent.

The condensation of the chlorphenol with phthalic anhydride and the ring closure and hydrolysis of the resulting condensation product are broadly claimed in our U. S. Patent No. 1,886,237, issued November 1, 1932.

*Color base formation.*—In a covered vessel provided with a vent, heating and cooling means, and an agitator, 400 parts aniline, 100 parts of the dry mixture of chlorhydroxyanthraquinones and hydroxyanthraquinones comprising crude 2-chlorquinizarine (obtainable as described above), and 12.5 parts of crystallized boric acid are mixed at ordinary temperature and the mixture is then heated and held at a temperature of about 100°–120° C. for about one-half hour, a current of air being drawn over the surface of the mixture to remove from the field of the reaction the water-vapor formed or present. A quantity of aniline is vaporized with the water and their vapor mixture is condensed and collected in a receiver. With the current of air continued, the reaction mass is then heated and held at a temperature of about 140°–145° C. for about 3 to 5 hours, or until the condensation is completed. The reaction-mass is cooled to about 45°–60° C. and added to 1400–1500 parts of sulfuric acid of about 33⅓ per cent strength, and then heated to 75°–80° C. for about an hour. It is then diluted with sufficient water to form a solution containing about 7 per cent sulfuric acid. The diluted solution is held at a temperature of about 60°–65° C. for an hour, then cooled to about 30°–40° C., filtered, and the precipitate is washed with warm water until free from acid, and dried. The resulting product is a color base which is essentially a mixture comprised of diphenylamino-hydroxyanthraquinone and other phenylaminoanthraquinone bodies.

The removal of water from the reaction mixture, together with aniline which accompanies the water vapor, depends considerably upon the rate and amount of air passed over the mixture, and should be controlled so as not to remove an excessive amount of aniline. The removal of the water permits the use of crystallized boric acid.

In the above formation of the color base, 2 to 6 parts of aniline may be used in place of 4 parts. Further, in place of aniline, other aromatic primary amines, e. g., toluidine, xylidine, cumidine, etc., may be condensed with the crude chlorquinizarine in a similar manner.

The color base and is formation are broadly claimed in U. S. Patent No. 1,892,871 to J. H. Crowell, issued January 3, 1933.

*Sulfonation of color base.*—In a vessel provided with heating and cooling means and an agitator, 100 parts of the color base mixture resulting from the process described above is dissolved in 600 parts of sulfuric acid monohydrate at a temperature of 45°–50° C. After holding the mixture at this temperature for about 3 hours, or until the sulfonation is complete, it is added, with cooling, to about 7000 parts of a 20° Bé. salt solution, stirred for a short period, and then filtered. The filter-cake is washed with a 20° Bé. salt until substantially free from sulfuric acid, and then dried. Instead of washing the filter-cake substantially completely acid free with salt solution, it may be placed in a vessel, an amount of sodium carbonate or other alkali added sufficient to neutralize the acid present, and without addition of water it may be stirred at a temperature of about 35°–80° C. until the paste becomes granular in appearance. It may be then cooled, filtered, and dried.

The sulfonation of the color base may be carried out with a weaker or stronger acid and at temperatures other than 45°–55° C. At a higher temperature e. g., 50°–55° C., the sulfonation proceeds rapidly and a shorter time is required, otherwise over-sulfonation takes place, while at lower temperatures, e. g. below 40° C., a longer time to complete the sulfonation is required. Insufficient sulfonation gives a product of poorer solubility. Instead of pouring the reaction-mass into a salt solution, it may be added to water and salted out in the usual manner, but a precipitate more difficult to filter is obtained.

The dyestuff thus obtained, in the dry state, is a sulfonic acid derivative of an anilido-hydroxyanthraquinone, is a dark powder readily soluble in cold and hot water, and dyes wool on a chrome mordant slate to gray to black shades which are of good fastness to light, to washing, and to fulling. The dyestuff is suitable for dyeing by all three chrome methods and for vigoureux printing.

We claim:

1. In the production of an anthraquinone coloring matter, the process which comprises reacting phenol with chlorine to produce a mixture of chlorphenols, one of which is 2.4-dichlorphenol; condensing the resulting mixture of chlorphenols with phthalic anhydride and anhydrous aluminum chloride to produce a mixture comprising 3'.5'-dichlor-2'-hydroxy-benzoyl-o-benzoic acid and a chlorhydroxyanthraquinone; subjecting the mixture comprising the dichlorhydroxybenzoic acid and chlorhydroxyanthraquinone thus obtained to condensation and hydrolysis to produce a composite product comprising a plurality of hydroxyanthraquinone compounds, one of which is 2-chlorquinizarine; condensing the resulting composite product comprising chlorquinizarine with a primary arylamine to produce a composite color base comprising a plurality of arylaminoanthraquinone compounds, one of which is a diarylamino-hydroxyanthraquinone; and subjecting the resulting composite color base to sulfonation to produce a mixture comprising a plurality of sulfonic acids of arylaminoanthraquinone compounds, one of which is a sulfonic acid of a diarylamino-hydroxyanthraquinone.

2. In the production of an anthraquinone coloring matter, the process which comprises reacting phenol with chlorine to produce a mixture of chlorinated phenols, one of which is 2.4-dichlorphenol; condensing the resulting mixture of chlorinated phenols with phthalic anhydride and anhydrous aluminum chloride to produce a mixture comprising a di-chlorhydroxybenzoylbenzoic acid and a chlorhydroxyanthraquinone; subjecting the mixture comprising the di-chlorhydroxybenzoylbenzoic acid and chlorhydroxyanthraquinone thus obtained to condensation and hydrolysis to produce a composite product comprising a plurality of hydroxyanthraquinone compounds, one of which is chlorquinizarine; condensing the resulting composite product comprising chlorquinizarine with a primary arylamine to produce a composite color base comprising a plurality of arylaminoanthraquinone compounds, one of which is a diarylaminohydroxyanthraquinone; subjecting the resulting composite color base to sulfonation to produce a mixture comprising a plurality of sulfonic acids of arylaminoanthraquinone compounds, one of which is a sulfonic acid of a diarylamino-hydroxyanthraquinone; and mixing the resulting sulfonic acid mixture with an aqueous solution of sodium chloride to produce a mixture comprising a plurality of sodium salts of sulfonic acids of arylaminoanthraquinone compounds, one of which is a sodium salt of a sulfonic acid of a diarylaminohydroxyanthraquinone.

3. In the production of an anthraquinone coloring matter, the improvement which comprises condensing a mixture of chlorphenols containing 2.4-dichlorphenol and a monochlorphenol with phthalic anhydride and anhydrous aluminum chloride to produce a mixture comprising 3'.5'-dichlor-2'-hydroxy-benzoyl-o-benzoic acid and a chlorhydroxyanthraquinone; subjecting the mixture comprising the dichlorhydroxybenzoylbenzoic acid and chlorhydroxyanthraquinone thus obtained to condensation and hydrolysis to produce a composite product comprising a plurality of hydroxyanthraquinone compounds, one of which is 2-chlorquinizarine; condensing the resulting composite product comprising chlorquinizarine with a primary arylamine to produce a composite color base comprising a plurality of arylaminoanthraquinone compounds, one of which is a diarylaminohydroxyanthraquinone; and subjecting the resulting composite color base to sulfonation to produce a mixture comprising a plurality of sulfonic acids of arylaminoanthraquinone compounds, one of which is a sulfonic acid of a diarylamino-hydroxyanthraquinone.

4. In the production of an anthraquinone coloring matter, the improvement which comprises subjecting a mixture of chlorhydroxybenzoylbenzoic acids, one of which is 3'.5'-dichlor-2'-hydroxybenzoylbenzoic acid, to condensation and hydrolysis to produce a composite product comprising a plurality of hydroxyanthraquinone compounds, one of which is 2-chlorquinizarine; condensing the resulting composite product comprising 2-chlorquinizarine with a primary arylamine to produce a composite color base comprising a plurality of arylaminoanthraquinone compounds, one of which is a diarylaminohydroxyanthraquinone; and subjecting the resulting composite color base to sulfonation to produce a mixture comprising a plurality of sulfonic acids of arylaminoanthraquinone compounds, one of which is a sulphonic acid of a diarylamino-hydroxyanthraquinone.

5. In the production of an anthraquinone coloring matter, the process which comprises passing chlorine into molten phenol at a temperature about 1° to about 5° C. above the setting point of the reaction mixture until a mixture of chlorphenols is produced containing 2.4-dichlorphenol and having a chlorine content corresponding to dichlorphenol; admixing the resulting mixture of chlorphenols in molten condition with phthalic anhydride and anhydrous aluminum chloride at a temperature of about 120° to about 160° C.; heating the resulting admixture at a final temperature of about 160° to about 180° C. to produce a condensation product containing aluminum; decomposing the condensation product with dilute sulfuric acid to produce a composite product comprising a plurality of chlorhydroxy-benzoyl-benzoic acids and including 3'.5'-dichlor-2'-hydroxy-benzoyl-o-benzoic acid and 2.4-dichlor-hydroxyanthraquinone; heating the resulting composite product with fuming sulfuric acid and boric acid to produce a mixture comprising a plurality of hydroxyanthraquinone compounds, one of which is 2-chlorquinizarine; heating the resulting mixture of hydroxyanthraquinone compounds with aniline and boric acid at a temperature of about 140° to about 150° C. while removing water from the field of the reaction to produce a color base mixture comprising a plurality of arylaminoanthraquinone compounds, one of which is diphenylamino-hydroxyanthraquinone; and sulfonating the color base mixture to produce a mixture comprising a plurality of sulfonic acids of arylaminoanthraquinone compounds, one of which is a sulfonic acid of diphenylamino-hydroxyanthraquinone.

6. In the production of an anthraquinone coloring matter, the process which comprises passing chlorine into molten phenol at a temperature about 1° to about 5° C. above the setting point of the reaction mixture until a mixture of chlorphenols is produced containing 2.4-dichlorphenol and having a chlorine content corresponding to dichlorphenol; adding the resulting mixture of chlorphenols in molten condition to a mixture of phthalic anhydride and aluminum chloride at a temperature of about 125° to about 130° C.; heating the resulting admixture at a final temperature of about 160° to about 180° C. to produce a condensation product containing aluminum; adding the resulting condensation product to dilute sulfuric acid to produce a composite product comprising a plurality of chlorhydroxybenzoyl-benzoic acids and including 3'.5'-dichlor-2'-hydroxy-benzoyl-o-benzoic acid and 2.4-dichlor-hydroxyanthraquinone; heating the resulting composite product with fuming sulfuric acid and boric acid at a temperature of about 160° to about 180° C. to produce a mixture comprising a plurality of hydroxyanthraquinone compounds, one of which is 2-chlorquinizarine; heating the resulting mixture of hydroxyanthraquinone compounds with aniline and boric acid at a temperature of about 140° to about 150° C. while passing a current of inert gas over the surface of the reaction mixture to remove water vapor, to produce a color base mixture comprising a plurality of arylaminoanthraquinone compounds, one of which is diphenylamino-hydroxyanthraquinone; reacting the color base mixture with sulfuric acid monohydrate at a temperature of about 40° to about 60° C. to produce a mixture comprising a plurality of sulfonic acids of arylamino-anthraquinone compounds, one of which is a sulfonic acid of diphenylamino-hydroxyanthraquinone; and salting out the resulting sulfonic acids by adding the sulfonation reaction mixture to a concentrated aqueous solution of sodium chloride.

7. As a product, a dyestuff whose dyeing action is dependent upon the presence of a plurality of sulfonic acids of arylaminoanthraquinone compounds, one of which is a sulfonic acid of diphenylamino-hydroxyanthraquinone, and obtainable by the process of claim 5.

8. As a product, a dyestuff whose dyeing action is dependent upon the presence of a plurality of sodium salts of sulfonic acids of arylaminoanthraquinone compounds, one of which is a sodium salt of a sulfonic acid of diphenylamino-hydroxyanthraquinone, and obtainable by the process of claim 6.

9. In the production of an anthraquinone coloring matter, the improvement which comprises condensing a mixture of chlorphenols having a chlorine content corresponding to dichlorphenol and containing 2.4-dichlorphenol and a monochlorphenol with phthalic anhydride and anhydrous aluminum chloride to produce a mixture comprising 3'.5'-dichlor-2'-hydroxy-benzoyl-o-benzoic acid and a chlorhydroxyanthraquinone.

10. In the production of an anthraquinone coloring matter, the improvement which comprises reacting phenol with chlorine to produce a mixture of chlorinated phenols, one of which is 2.4-dichlorphenol; and condensing the resulting mixture of chlorinated phenols with phthalic anhydride and anhydrous aluminum chloride to produce a mixture comprising a plurality of chlorhydroxybenzoylbenzoic acid compounds, one of which is a compound of 3'.5'-dichlor-2'-hydroxy-benzoyl-o-benzoic acid.

11. In the production of an anthraquinone coloring matter, the improvement which comprises passing chlorine into molten phenol until a mixture of chlorphenols is produced containing 2.4-dichlorphenol and having a chlorine content approximately corresponding to dichlorphenol, while maintaining the reaction mixture at a final temperature of about 38° to about 40° C.; incorporating 1 mol of the resulting mixture of chlorphenol in molten condition with a mixture of about 1 to about 2 mols of phthalic anhydride and about 1.5 to about 2.5 mols of anhydrous aluminum chloride, and heating the resulting mixture at a temperature of about 160° to about 180° C.

12. As a product, a mixture of chlorhydroxybenzoylbenzoic acids, one of which is 3'.5'-dichlor-2'-hydroxy-benzoyl-o-benzoic acid, obtainable by condensing phthalic anhydride and anhydrous aluminum chloride with a mixture of chlorphenols containing 2.4-dichlorphenol and a monochlorphenol and having a setting-point of about 35° to 37° C.

13. In the production of an anthraquinone coloring matter, the improvement which comprises condensing a mixture of chlorphenols having a chlorine content corresponding to dichlorphenol and containing 2.4-dichlorphenol and a monochlorphenol with phthalic anhydride and anhydrous aluminum chloride to produce a mixture comprising a plurality of chlorhydroxybenzoylbenzoic acids, one of which is 3'.5'-dichlor-2'-hydroxy-benzoyl-o-benzoic acid, and a chlorhydroxyanthraquinone; and subjecting the said mixture thus obtained to condensation and hydrolysis to produce a composite product comprising a plurality of hydroxyanthraquinone compounds, one of which is chlorquinizarine.

14. In the production of an anthraquinone coloring matter, the improvement which comprises heating 3′.5′-dichlor-2′-hydroxy-benzoyl-o-benzoic acid in admixing with a chlorhydroxyanthraquinone compound with a mixture of sulfuric and boric acids to produce a mixture of hydroxyanthraquinone compounds, one of which is 2-chlorquinizarine.

15. In the production of an anthraquinone coloring matter, the improvement which comprises heating a mixture of chlorhydroxybenzoylbenzoic acids, one of which is 3′.5′-dichlor-2′-hydroxybenzoyl-o-benzoic acid, with a mixture of fuming sulfuric acid and boric acid at a temperature of about 160° to about 180° C. to produce a composite product comprising a plurality of hydroxyanthraquinone compounds, one of which is 2-chlorquinizarine.

16. As a product, a mixture of hydroxyanthraquinone compounds, one of which is 2-chlorquinizarine, and obtainable by the process of claim 14.

17. In the production of an anthraquinone coloring matter, the improvement which comprises reacting phenol with chlorine to produce a mixture of chlorphenols, one of which is 2.4-dichlorphenol; condensing the resulting mixture of chlorphenols with phthalic anhydride and anhydrous aluminum chloride to produce a mixture comprising 3′.5′-dichlor-2′-hydroxy-benzoyl-o-benzoic acid and a chlorhydroxyanthraquinone; subjecting the mixture comprising the dichlorhydroxybenzoylbenzoic acid and chlorhydroxyanthraquinone thus obtained to condensation and hydrolysis to produce a composite product comprising a plurality of hydroxyanthraquinone compounds, one of which is 2-chlorquinizarine; and condensing the resulting composite product comprising 2-chlorquinizarine with a primary arylamine to produce a composite color base comprising a plurality of arylaminoanthraquinone compounds, one of which is a diarylaminohydroxyanthraquinone.

18. In the production of an anthraquinone coloring matter, the improvement which comprises subjecting a mixture of chlorhydroxybenzoylbenzoic acids, one of which is 3′.5′-dichlor-2′-hydroxybenzoylbenzoic acid to condensation and hydrolysis to produce a composite product comprising a plurality of hydroxyanthraquinone compounds, one of which is 2-chlorquinizarine; and condensing the resulting composite product comprising 2-chlorquinizarine with aniline to produce a composite color base comprising a plurality of phenylaminoanthraquinone compounds, one of which is a diphenylamino-hydroxyanthraquinone.

19. In the production of an anthraquinone coloring matter, the improvement which comprises condensing a mixture of chlorphenols having a chlorine content corresponding to dichlorphenol and containing 2.4-dichlorphenol and a monochlorphenol with phthalic anhydride and anhydrous aluminum chloride to produce a mixture comprising a plurality of chlorhydroxybenzoylbenzoic acids, one of which is 3′.5′-dichlor-2′-hydroxy-benzoyl-o-benzoic acid, and a chlorhydroxyanthraquinone, subjecting the said mixture thus obtained to condensation and hydrolysis to produce a composite product comprising a plurality of hydroxyanthraquinone compounds, one of which is chlorquinizarine, heating 1 part of said composite product with aniline in excess and boric acid at a temperature of about 140° to about 145° C., cooling the resulting reaction mixture and adding it to about 15 parts of sulfuric acid of about 30 to about 35 per cent. strength at a temperature of about 60° to about 65° C., heating the resulting sulfuric acid mixture at about 75° to about 80° C. to convert the excess aniline to aniline sulfate, then diluting the mixture to an acid strength of about 6 to about 8 per cent., heating the diluted mixture to decompose boric acid compounds, and filtering off the precipitate.

20. As a product, a mixed color base whose coloring action is dependent upon the presence of a plurality of phenylaminoanthraquinone compounds, one of which is diphenylamino-hydroxyanthraquinone, obtainable by the process of claim 18.

21. In the production of an anthraquinone coloring matter, the improvement which comprises condensing a mixture of hydroxyanthraquinone compounds, one of which is 2-chlorquinizarine, with a primary arylamine to produce a composite color base comprising a plurality of arylaminoanthraquinone compounds, one of which is a diarylamino-hydroxyanthraquinone; and subjecting the resulting composite color base to sulfonation to produce a mixture comprising a plurality of sulfonic acids of arylaminoanthraquinone compounds, one of which is a sulfonic acid of a diarylamino-hydroxyanthraquinone.

22. In the production of an anthraquinone coloring matter, the improvement which comprises subjecting a mixture of arylaminoanthraquinone compounds, one of which is a diarylamino-hydroxyanthraquinone, to sulfonation to produce a mixture comprising a plurality of sulfonic acids of arylaminoanthraquinone compounds, one of which is a sulfonic acid of a diarylamino-hydroxyanthraquinone; and mixing the resulting sulfonic acid reaction mixture with an aqueous solution of sodium chloride to produce a mixture comprising a plurality of sodium salts of sulfonic acids of arylaminoanthraquinone compounds, one of which is a sodium salt of a sulfonic acid of a diarylamino-hydroxyanthraquinone.

23. In the production of an anthraquinone coloring matter, the improvement which comprises adding a mixture of sulfonic acids of arylaminoanthraquinone compounds, one of which is a sulfonic acid of a diphenylamino-hydroxyanthraquinone, to a concentrated aqueous solution of sodium chloride to produce a mixture comprising a plurality of sodium salts of sulfonic acids of arylaminoanthraquinone compounds, one of which is a sodium salt of a sulfonic acid of a diphenylamino-hydroxyanthraquinone.

24. In the production of an anthraquinone coloring matter, the improvement which comprises adding a mixture of sulfonic acids of arylaminoanthraquinone compounds, one of which is a sulfonic acid of a diarylamino-hydroxyanthraquinone, to a concentrated aqueous solution of sodium chloride to precipitate a mixture of sodium salts of sulfonic acids of arylaminoanthraquinone compounds, one of which is a sodium salt of a sulfonic acid of a diarylamino-hydroxyanthraquinone, filtering off the resulting precipitate, and washing the filter-cake substantially acid free with aqueous sodium chloride solution.

25. In the production of an anthraquinone coloring matter, the improvement which comprises mixing a sulfonation reaction mixture resulting from the sulfonation of a mixture of arylaminoanthraquinone compounds and containing a plurality of sulfonic acids of arylaminoanthraquinone compounds, one of which is a sulfonic acid of a diarylamino-hydroxyanthraquinone, with a concentrated aqueous solution of sodium chloride to produce a mixture comprising a plurality of sodium salts of sulfonic acids of arylaminoanthraquinone compounds, one of which is a sodium salt of a sulfonic acid of a diarylamino-hydroxyanthraquinone, filtering off the resulting precipitate, stirring the filter-cake and heating at a temperature of about 40° to about 70° C. until a fluid suspension is produced containing the precipitate in a granular form, and filtering off the resulting granular precipitate.

26. In the production of an anthraquinone coloring matter, the improvement which comprises adding a sulfonation reaction mixture resulting from the sulfonation of a mixture of arylaminoanthraquinone compounds and containing a plurality of sulfonic acids of arylaminoanthraquinone compounds, one of which is a sulfonic acid of a diphenylamino-hydroxyanthraquinone, to a concentrated aqueous solution of sodium chloride to produce a mixture comprising a plurality of sodium salts of sulfonic acids of arylaminoanthraquinone compounds, one of which is a sodium salt of a sulfonic acid of a diphenylamino-hydroxyanthraquinone, filtering off the resulting precipitate, stirring the filter-cake to form a fluid suspension, adding an alkali to render the resulting suspension substantially neutral, heating the suspension at a temperature of about 40° to about 70° C., and filtering off the resulting granular precipitate.

27. As a product, a dyestuff whose dyeing action is dependent upon the presence of a plurality of sodium salts of sulfonic acids of arylaminoanthraquinone compounds, one of which is a sodium salt of a sulfonic acid of a diarylamino-hydroxyanthraquinone, in the form of a granular precipitate, and obtainable by the process of claim 25.

28. As a product, a dyestuff whose dyeing action is dependent upon the presence of a plurality of sulfonic acids of arylaminoanthraquinone compounds, one of which is a sulfonic acid of a diarylamino-hydroxyanthraquinone, and obtainable by the process of claim 1.

29. As a product, a dyestuff whose dyeing action is dependent upon the presence of a plurality of sodium salts of sulfonic acids of arylaminoanthraquinone compounds, one of which is a sodium salt of a sulfonic acid of a diarylamino-hydroxyanthraquinone, and obtainable by the process of claim 2.

30. In the production of an anthraquinone coloring matter, the process which comprises condensing a mixture of chlorphenols with phthalic anhydride in the presence of anhydrous aluminum chloride to produce a mixture comprising a chlorhydroxy-benzoyl-o-benzoic acid and a chlorhydroxyanthraquinone, subjecting the resulting mixture to condensation and hydrolysis to produce a composite product containing hydroxyanthraquinone bodies, condensing this composite product with an aromatic primary amine to produce a composite color base, and subjecting the color base thus produced to sulfonation.

31. In the production of an anthraquinone coloring matter by a process which comprises condensing a chlorphenol with phthalic anhydride in the presence of anhydrous aluminum chloride whereby a mixture comprising a chlorhydroxybenzoyl-o-benzoic acid and a chlorhydroxyanthraquinone is produced, subjecting the resulting mixture to condensation and hydrolysis to produce a chlorquinizarine, condensing the quinizarine product with an aromatic primary amine to produce a color base, and subjecting the color base so produced to sulfonation, the improvement comprising reacting the phthalic anhydride with a mixture of chlorphenols containing dichlorinated phenol as the initial material.

32. In the production of an anthraquinone coloring matter, the improvement which comprises mixing a sulfonation reaction mixture resulting from the sulfonation of a diarylamino-hydroxy anthraquinone, and containing a sulfonic acid of a diarylamino-hydroxyanthraquinone, with a concentrated aqueous solution of sodium chloride to produce a sodium salt of a sulfonic acid of a diarylamino-hydroxyanthraquinone, filtering off the resulting precipitate, stirring the filter-cake and heating at a temperature of about 40° to about 70° C. until a fluid suspension is produced containing the precipitate in a granular form, and filtering off the resulting granular precipitate.

JOYCE H. CROWELL.
JAMES OGILVIE.
DONALD G. ROGERS.